United States Patent [19]

Kunishige

[11] Patent Number: 5,300,975
[45] Date of Patent: Apr. 5, 1994

[54] MOTOR-DRIVEN FILM TRANSPORTING DEVICE FOR CAMERAS

[75] Inventor: Keiji Kunishige, Tokyo, Japan

[73] Assignee: Olympus Optical Co., Ltd., Tokyo, Japan

[21] Appl. No.: 889,448

[22] Filed: May 27, 1992

[30] Foreign Application Priority Data

Jun. 5, 1991 [JP] Japan .................................. 3-134435

[51] Int. Cl.⁵ ............................ G03B 1/18; G03B 1/00
[52] U.S. Cl. ................................. 354/173.11; 354/214
[58] Field of Search .................. 354/173.11, 173.1, 214

[56] References Cited

U.S. PATENT DOCUMENTS

| | | | |
|---|---|---|---|
| 4,437,163 | 10/1984 | Matsumoto et al. | 354/173.11 |
| 4,494,842 | 1/1985 | Kimura et al. | 354/173.11 |
| 4,572,637 | 2/1986 | Inoue | 354/173.11 |
| 4,679,926 | 7/1987 | Suzuki et al. | 354/173.11 |
| 4,728,976 | 3/1988 | Takahashi et al. | 354/173.11 |
| 4,752,793 | 6/1988 | Kawamura | 354/173.11 |
| 4,945,370 | 7/1990 | Shimada et al. | 354/173.1 |

FOREIGN PATENT DOCUMENTS 1-279228 11/1989 Japan .
2-21571 5/1990 Japan .

Primary Examiner—Michael L. Gellner
Assistant Examiner—Nicholas J. Tuccillo
Attorney, Agent, or Firm—Frishauf, Holtz, Goodman & Woodward

[57] ABSTRACT

A motor-driven film rewinder rewinds a roll of film loaded into a cassette and wound up on a film take-up spool of a camera. A signal generator generates a film movement signal as the film moves. A film movement stoppage detector is connected to the signal generator to output a film movement stoppage signal when no film movement signal is output from the signal generator for a first reference period of time. A motor controller is responsive to the film movement stoppage signal from the film movement stoppage detector to stop the operation of the motor-driven film rewinder. A timer starts a time count operation at a point of time at which the motor-driven film rewinder begins a film rewinding operation and keeps the film rewinder performing the film rewinding operation for a second reference period of time longer than the first reference period of time. The motor controller operates after a lapse of the second reference period of time. That is, at the time of a film rewind operation, the motor-driven film rewinder keeps operating for the second reference period of time regardless of whether the film is transported or not. After a lapse of the second reference period of time, the motor-driven film rewinder is stopped at a point of time at which the first reference period of time elapses from when the film movement is stopped.

20 Claims, 4 Drawing Sheets

| FILM TYPE | TIME |
|---|---|
| 12 EXPOSURES | 15 SEC |
| 24 EXPOSURES | 15 SEC |
| 36 EXPOSURES | 10 SEC |
| 72 EXPOSURES | 10 SEC |

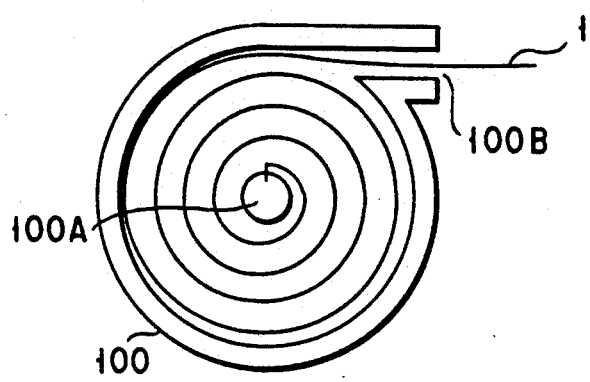
F I G. 6A    (PRIOR ART)
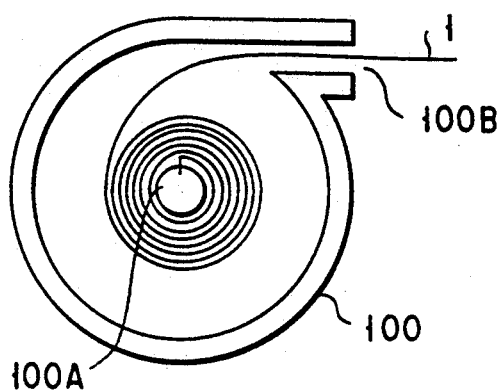
F I G. 6B    (PRIOR ART)
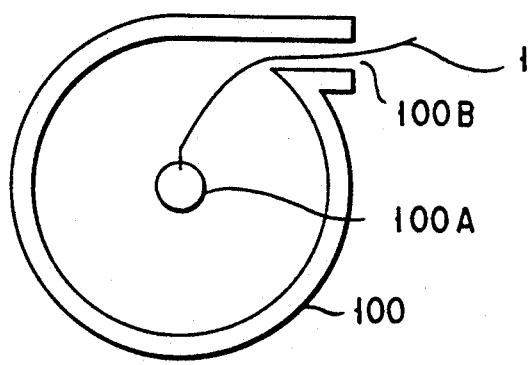
F I G. 6C    (PRIOR ART)

MOTOR-DRIVEN FILM TRANSPORTING DEVICE FOR CAMERAS

BACKGROUND OF THE INVENTION

1. Field of the Invention

The present invention relates to a motor-driven film transporting device for cameras and, more particularly, to a camera having a motor-driven film rewinding device equipped with a timer circuit adapted to automatically bring a film rewind operation to a stop by detecting the film movement state.

2. Description of the Related Art

First, reference will be made to FIGS. 6A, 6B, and 6C to describe phenomena occurring at the time of rewinding of a roll of film loaded into a camera. In a film cassette 100, as shown in FIG. 6A, a roll of film is wound around a spool 100A within the cassette with its rear end attached to the spool and its leader drawn out from an exit slot 100B. In this case, the film 1 will spread up to the inner wall of the cassette 100 because of its elasticity. In this state, the film 1 is drawn out frame by frame with each shot. Finally, the state of FIG. 6C results. When a film rewind operation is performed in this state, the film will be rewound into the cassette 100 immediately. However, in the case of premature rewind in which a roll of film is rewound in such a state shown in FIG. 6A, that is, with some film frames left unexposed within the cassette 100, the film state merely transfers, at the initial stage of the rewind operation, from the state in which the film is spread within the cassette as shown in FIG. 6A to the state in which the film is tightly wound around the spool as shown in FIG. 6B. That is, at the initial stage of the rewind operation, the film portion that is drawn out from the cassette exit slot 100B scarcely moves. It is not until the film enters the state of FIG. 6B that the film portion that is drawn out is taken up into the cassette.

In the following description, such a state as shown in FIG. 6A is referred to as a loosely wound state, while such a state as shown in FIG. 6B is referred to as a tightly wound state.

Heretofore, among cameras equipped with motor-driven film rewinding devices there are cameras that activate a timer in response to the stoppage of movement of a roll of film and stop rewinding the film after a lapse of a predetermined period of time. With such a rewind stopping device using a timer, when the rewind of film is started in the loosely wound state shown in FIG. 6A. the timer runout may occur before the film becomes tightly wound as shown in FIG. 6B, so that the rewinding device comes to a stop before the film is rewound completely. To solve this problem, a longer period of time could be set at the timer. However, this approach would cause the motor to run idly for a long period of time after the termination of a film rewind operation.

In contrast, in Japanese Unexamined Patent Publication No. 1-279228 there is disclosed a technique of setting a sufficiently long period of time at the timer only in the case of premature rewind. This technique is the result of attention to the fact that the loosely wound state occurs only when the film is rewound prematurely.

U.S. Pat. No. 4,679,926 discloses a technique of setting a long period of time at the timer when film is in the loosely wound state, and changing the period of time set at the timer to a shorter period of time when the film is not in the loosely wound state or when the film has been released from the loosely wound state, these film states being detected in accordance with the movement of film.

However, the technique disclosed in the Japanese Unexamined Patent Publication can prevent the long idle running of the motor at the time of completion of a film rewind operation in the case of autorewind but cannot prevent the long idle running in the case of the premature rewind.

Taking the usage of cameras into considerations, the premature rewind is often performed when film has to be replaced with another as soon as possible. Thus, the long idle running of the motor is not desirable.

On the other hand, with the approach disclosed in U.S. Pat. No. 4,679,926, which changes a period of time set at the timer to another in response to the detection of movement of film, the following problems will arise. That is, film is unstable in the loosely wound state, and thus a phenomenon may occur in which a small number of film-movement signal is output at the same time the film begins to move immediately after the start of rewinding of the film, and the signal ceases to be output very soon. This phenomenon is liable to occur at low temperatures at which the stiffness of film is high, in particular.

In addition, when the film stays in the neighborhood of the threshold of the film movement detecting device, in other words, when, in the case where the film movement detecting device is constructed from a photo reflector, the film is stopping in such a position that detecting light falls on the edge portion of a sprocket hole of film or its neighborhood, a film movement signal may be output by means of noise resulting from idle run of the motor.

In conclusion, in the case of the latter technique as well, if a small number of pulses are output at the beginning of a film rewind operation, and, after that, the winding up of film is continued under the situation in which the output of the film movement detecting device is unstable during the transition from the loosely wound state to the tightly wound state, a period of time set at the timer will be changed to a shorter period of time by those pulses. Therefore, the rewinding device will automatically be brought to a stop while the film is being wound up.

SUMMARY OF THE INVENTION

It is therefore an object of the present invention to provide a motor-driven film transporting device for a camera which permits film to be rewound surely regardless of the presence or absence of its loosely wound state and the idle running time of a film rewinding motor at the completion of the film rewinding operation to be reduced as much as possible to thereby shorten the time it takes to rewind the film.

According to the present invention there is provided a motor-driven film transporting device in a camera comprising:

motor-driven film advancing means for advancing a film one frame in response to the termination of a shooting operation;

signal generating means for generating a film movement signal as the film moves;

film end detecting means for beginning counting a first reference period of time when the motor-driven film advancing means is operated and outputting a stop signal to the motor-driven film advancing means when a predetermined amount of film movement signal is not generated from the signal generating means within the first reference period of time;

manual operation means for manually instructing a film rewind operation;

motor-driven film rewinding means responsive to either the manual operation means or the film end detecting means for rewinding the film;

timer means for beginning counting a second reference period of time when the motor-driven film rewinding means operates; and termination-of-rewinding detecting means for beginning counting a third reference of time upon termination of counting of the second reference period of time by the timer means, resetting and restarting the counting of the third reference period of time when the film movement signal is generated from the signal generating means within the third reference period of time, and outputting a stop signal to the motor-driven film rewinding means at the point of time at which the third reference period of time elapses when the film movement signal is not generated from the signal generating means within the third reference period of time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6A, 6B and 6C illustrate various states of a roll of film within a cassette.

DETAILED DESCRIPTION OF THE PREFERRED EMBODIMENTS

Figure 1:
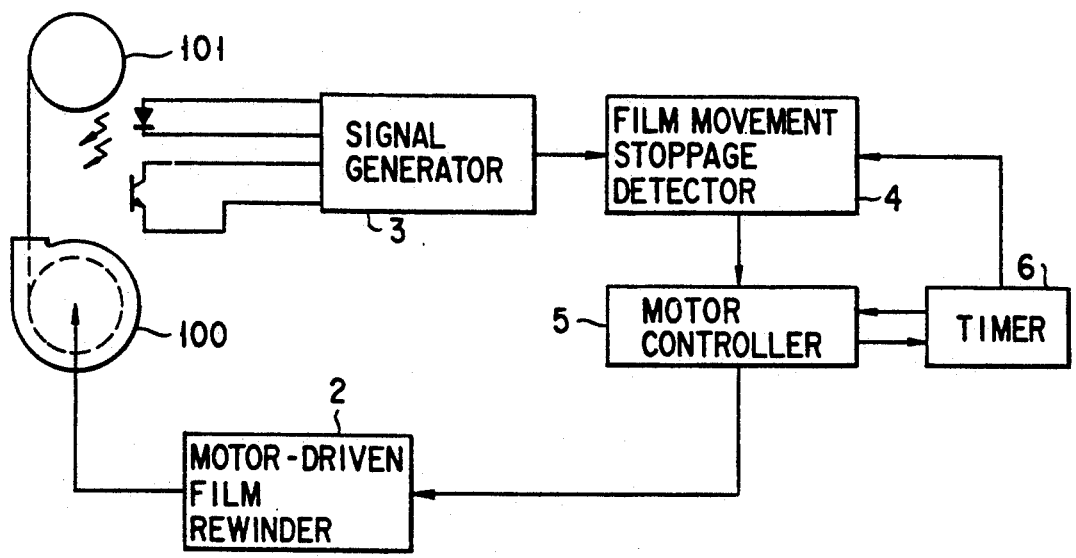
FIG. 1 is a simplified block diagram of a first embodiment of a motor-driven film transporting device according to the present invention.

Referring now to FIG. 1, a motor-driven film transporting device according to a first embodiment of the present invention comprises a motor-driven film rewinder 2 for rewinding a roll of film 1 loaded into a cassette 100 and taken up by a take-up spool 101 of a camera, a signal generator 3 for generating a film movement signal as the film moves, a film movement stoppage detector 4 coupled to the signal generator 3 for outputting a movement stoppage signal when the film movement signal is not output from the signal generator 3 for a first reference period of time, a motor controller 5 responsive to the output signal of the film movement stoppage detector 4 for stopping the operation of the motor-driven film rewinder 2, and a timer 6 that starts a time count operation from a point of time when the motor-driven rewinder 2 begins a film rewinding operation and keeps the motor-driven film rewinder operating for a second reference period of time longer than the first reference period of time. The motor controller 5 stops the operation of the rewinder 2 after a lapse of the second reference period of time.

That is, at the time of a film rewinding operation, the motor-driven film rewinder 2 continues a film rewind operation for the second reference period of time regardless of whether the film feeding operation is performed or not, and, after a lapse of the second reference period of time, when the film feeding operation is stopped, the rewinder is brought to a stop at the point of time the first reference period of time elapses.

Hereinafter, the arrangement of the first embodiment of the present invention will be described in detail with reference to the drawings.

Figure 2:
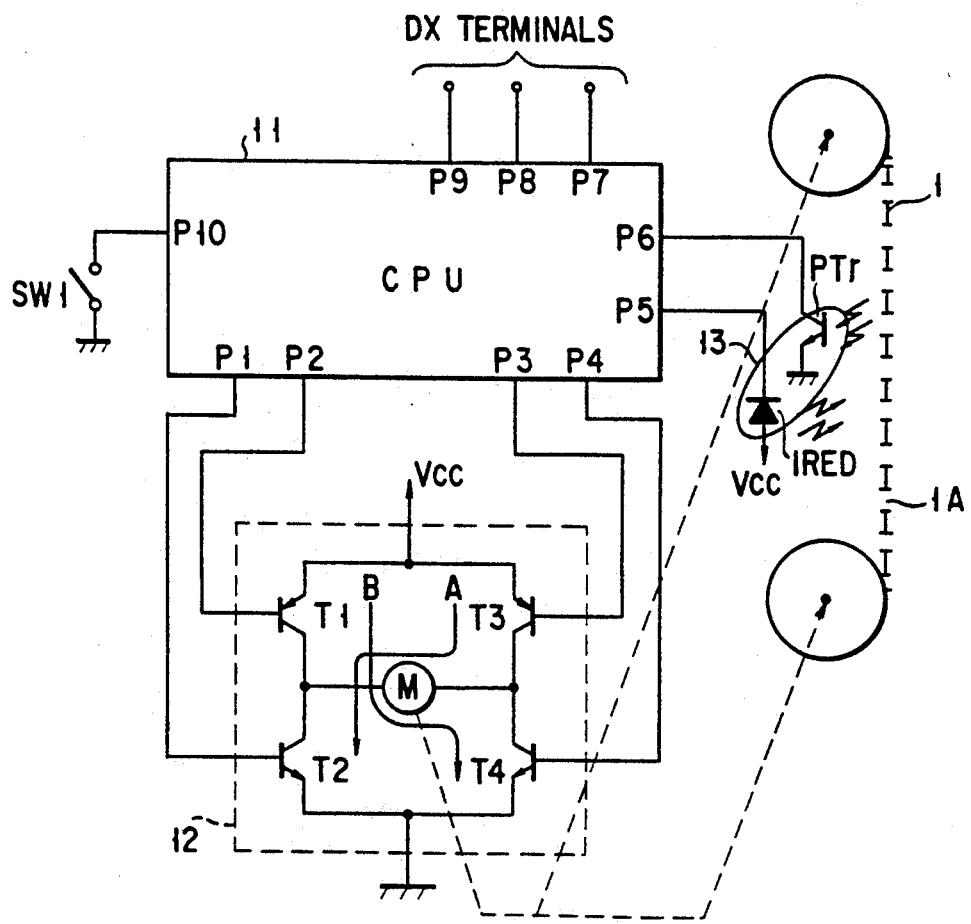
FIG. 2 illustrates a circuit arrangement of the first embodiment of FIG. 1.

In FIG. 2, a CPU (central processing unit) 11 controls a motor bridge circuit 12 including transistors T1 through T4 to cause a motor M to rotate in the forward or reverse direction, or stop, thereby permitting the film 1 to be advanced, rewound, or stopped.

The transistors T2 and T3 are turned on by a film advance signal from the CPU 11 to cause the motor M to rotate in the forward direction, advancing the film 1 with the aid of a known gear train. On the other hand, the transistors T1 and T4 are turned on by a film rewind signal from the CPU 11 to cause the motor M to rotate in the reverse direction, rewinding the film 1. That is, the transistors T2, T3, and the motor M arranged on the path indicated by arrow a comprise motor-driven film advancing section, while the transistors T1, T4, and the motor M arranged on the path indicated by arrow B comprise the motor-driven film rewinder 2 shown in FIG. 1.

The CPU 11 reads the DX code on a film cassette loaded into the camera through DX terminals and decides the number of frames of the film.

A switch SW1 is manually closed in performing a premature rewinding operation, i.e., in performing a rewinding operation before the frames of the film are all exposed. The CPU 11 starts a film rewind operation when the switch SW1 is turned on or when on/off waveforms from a photo reflector 13, which are generated when sprocket holes 1A of the film move during single frame advance, cease to be applied thereto.

As is well known, the photoreflector 13 comprises a near-infrared emitting diode (hereinafter referred to as an IRED) and a phototransistor (hereinafter referred to as a PTr) and outputs pulse waveforms resulting from a difference in reflectance between the sprocket holes 1A and the non-holed portion of the film.

In rewinding the film, the CPU 11 turns the transistors T1 and T4 on for, for example, 15 seconds (the second reference period of time) after the start of a film rewind operation in accordance with a built-in timer and, thereafter, turns the transistors T1 and T4 on for, for example, four seconds (the first reference period of time) from when the photoreflector 13 ceases to output the pulse waveforms. Immediately after the lapse of four seconds, the CPU applies the brake to the motor M.

Figure 3:
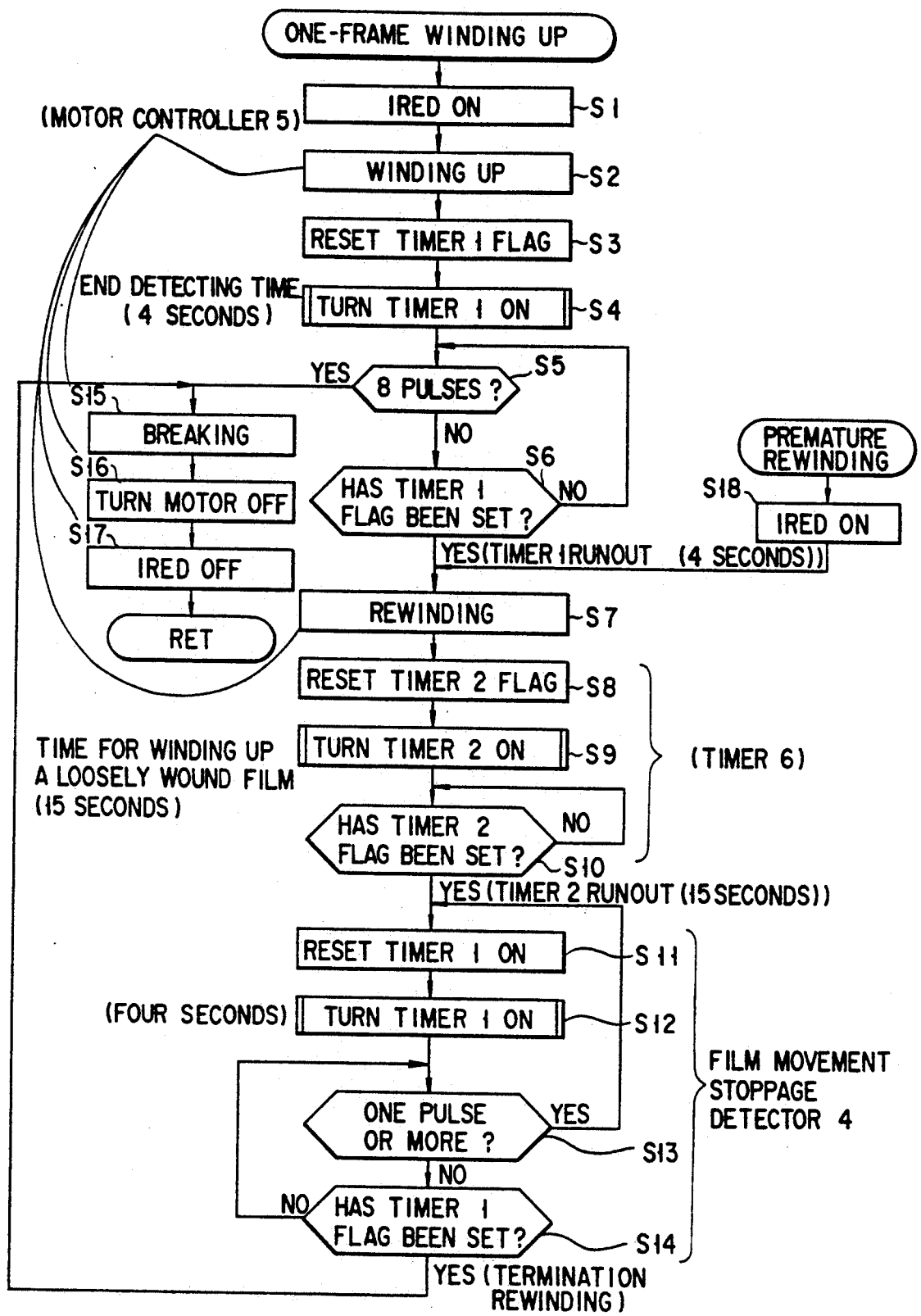
FIG. 3 is a flowchart for use in explanation of the operation of the first embodiment of the present invention.

The operation of the above arrangement will be described in more detail with reference to a flowchart of FIG. 3.

First, a port P5 of the CPU 11 is set to a low level so as to cause the IRED 11 to emit infrared rays (step S1). Next, the CPU 11 sets its ports P1, P2, P3, and P4 high, high, low, and low, respectively, thereby rotating the motor M in the forward direction that takes up the film 1 (step S2). After resetting a timer 1 flag (not shown) within the CPU 11 (step S3), a timer 1 not shown within the CPU is activated to initiate a time count operation (step S4). In this example described herein, four seconds is set at the timer 1. At the termination of the time count operation of the timer 1, the timer 1 flag is set.

The CPU 11 detects an input at its port P6 to count the sprocket holes 1A of the film. That is, the CPU decides whether or not the film has moved through the distance corresponding to eight sprocket holes (step S5). If YES in step S5, the operation advances to step S15 which will be described later.

When the film has not moved through the distance corresponding to eight sprocket holes, on the other hand, the CPU 11 decides whether or not the timer 1 flag has been set (step S6). The setting of the timer 1 flag means that the film 1 can no longer be wound up, i.e., the film is at an end. Thus, if the timer 1 flag has been set, the operation advances to step S7 of rewinding the film. If, on the other hand, the flag has not been set, then the operation returns to step S5.

In step S7 of rewinding the film, the ports P1, P2, P3, and P4 of the CPU 11 are set low, low, high, and high, respectively, thereby causing the motor M to rotate in the reverse direction that rewinds the film 1.

After resetting a timer 2 flag (not shown) arranged within the CPU 11 (step S8), a timer 2 not shown within the CPU is activated, starting a time count operation (step S9). Here, the timer 2 is set to 15 seconds necessary and sufficient to wind up a loosely wound film. At the termination of the time count operation of the timer 2, the timer 2 flag is set. Subsequently, the CPU 11 decides whether or not the timer 2 flag has been set (step S10). If the timer 2 flag has not been set, step S10 is repeated. Steps S8, S9 and S10 implement the function of the timer 6.

If the timer 2 flag has been set, the timer 1 flag is reset again (step S11), and then the timer 1 is activated (step S12). Here, the CPU 11 detects outputs of the PTr to decide whether or not the film has moved through a distance corresponding to one sprocket hole or more (step S13). If YES, return is made to step S11. Otherwise, the operation advances to subsequent step S14. In step S14, a decision is made as to whether or not the timer 1 flag has been set, that is, whether or not four seconds have elapsed from when the PTr ceased outputting signals. If the timer 1 flag has been set, the decision is the end of the rewinding operation, so that the operation advances to subsequent step S15. Steps S11, S12, S13 and S14 implement the function of the film movement stoppage detector 4.

In step S15, the ports P1, P2, P3, and P4 of the CPU 11 are all set high, applying the brake to the motor M. Subsequently, the ports P1, P2, P3, and P4 are set low, high, high, and low, respectively, turning off power to the motor M (step S16). And the port P5 of the CPU 11 is set high, turning off the IRED of the photo-reflector 13 (step S17). Steps S15, S16 and S17, and steps S2 and S7 implement the function of the motor controller 5.

When the switch SW1 is closed to instruct the CPU 11 to perform premature rewinding, the port P5 is set low, turning on the IRED of the photoreflector 13 (step S18). Subsequently, the above-described operation is performed from step S7.

In the first embodiment described above, the timer in step S4 is also used as the timer in step S12. Alternatively, different periods of time may be set at the timers in step S4 and the timer in step S12.

Figures 4, 5:
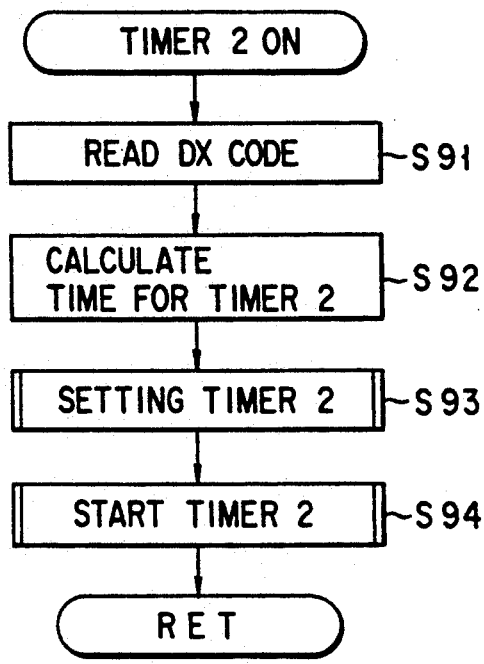
FIG. 4 is a flowchart for use in explanation of the operation of a second embodiment of the present invention.
FIG. 5 shows a table used in the operation of the second embodiment of the present invention.

Although, in step S9, a fixed value (15 seconds) is set at the timer 2, the value may be varied according to conditions. FIG. 4 illustrates a subroutine of step S9 in such a case. That is, first, the DX code on a film cassette loaded into the camera is read to detect how many frames the film has (step S91). Next, on the basis of such a table as shown in FIG. 5 that is created in a memory incorporated into or connected to the CPU 11, the time set for each type of film is multiplied by 1 − (the number of exposed frames / the number of frames of film). Thereby, a period of time to be set at the timer 2 is calculated in step S92. Then, the time thus calculated is set at the timer 2 in step S93, whereby the timer 2 is started (step S94).

As described above, at the time of a film rewind operation, film is rewound for a fixed period of time to release film from a loosely wound state regardless of whether a film transport operation is performed or not, that is, regardless of automatic rewinding and forced rewinding. After the lapse of the fixed period of time, the timer is set to detect the termination of rewinding. When no film movement is detected during a period of time set at the timer, it is decided that the rewinding has come to an end. Then, the film rewinding motor is brought to a stop. Therefore, the rewinding operation can be performed surely regardless of the presence or absence of loose winding, and the idle rotation time of the motor when the rewinding operation is completed can be decreased as much as possible to shorten the time spent in rewinding film.

As described above, according to the present invention, the rewinding operation can be performed surely regardless of the presence or absence of loose winding, and the idle rotation time of the motor when the rewinding operation is completed can be decreased as much as possible to shorten the time spent in rewinding film.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A motor-driven film transporting device in a camera, comprising:
    motor-driven film advancing means for advancing a film one frame in response to the termination of a shooting operation;
    signal generating means for generating a film movement signal as the film moves;
    film end detecting means for beginning counting of a first reference period of time when said motor-driven film advancing means is operated and for outputting a stop signal to said motor-driven film advancing means when a predetermined amount of film movement signal is not generated from said signal generating means within said first reference period of time;

manual operation means for manually instructing a film rewind operation;

motor-driven film rewinding means responsive to either said manual operation means or said film end detecting means for rewinding the film;

timer means for beginning counting of a second reference period of time when said motor-driven film rewinding means operates; and termination-of-rewinding detecting means for beginning counting of a third reference of time upon termination of counting of said second reference period of time by said timer means, for resetting and restarting the counting of said third reference period of time when the film movement signal is generated from said signal generating means within said third reference period of time, and for outputting a stop signal to said motor-driven film rewinding means at the point of time at which said third reference period of time elapses when the film movement signal is not generated from said signal generating means within said third reference period of time.

2. The device according to claim 1, wherein aid motor-driven film advancing means and said motor-driven film rewinding means are operated from a common drive source.

3. The device according to claim 1, wherein said first reference period of time is equal to said third reference period of time.

4. The device according to claim 1, wherein said second reference period of time is long enough to change the film in a cassette from a loosely wound state to a tightly wound state.

5. The device according to claim 1, wherein said timer means includes means for changing said second reference period of time according to the number of film frames capable of being photographed.

6. A control device for controlling a film transporting in a camera, comprising:

motor-driven film transporting means for advancing and rewinding a roll of film loaded into the camera;

signal generating means responsive to the movement of the film for generating a film movement signal;

first timer means for counting a first reference period of time;

second timer means for counting a second reference period of time longer said first reference period of time; and control means for controlling said motor-driven film transporting means and said first and second timer means, said control means being arranged so as to:

(a) at the time of the advancing of the film, start said first timer means in response to the beginning of a film advancing operation by said motor-driven film transporting means and stop said motor-driven film transporting means when no film movement signal is generated from said signal generating means within said first reference period of time counted by said first timer means; and (b) at the time of the rewinding of the film, start said second timer means in response to the beginning of a film rewind operation, start said first timer means after a lapse of said second reference period of time counted by said second timer means, and stop said motor-driven film transporting means when no film movement signal is generated from said signal generating means within said first reference period of time counted by said first timer means.

7. A control device for controlling a rewinding of a roll of film in a camera, comprising:

motor-driven film rewinding means responsive to a film end signal or a rewinding start signal from a manually operating member for rewinding the film;

signal generating means for generating a film movement signal as the film moves;

first timer means for counting a first reference period of time;

film movement stoppage detecting means for outputting a film movement stop signal when said film movement signal is not output from said signal generating means even within the first reference period of time counted by said first timer means;

second timer means for keeping the operation of said motor-driven film rewinding means for a second reference period of time longer than said first reference period of time; and control means responsive to the film movement stop signal output from said movement stoppage detecting means for stopping the operation of said motor-driven film rewinding means, and wherein said first timer means and said movement stoppage detecting means operate after a lapse of said second reference period of time counted by said second timer means.

8. A device for controlling a rewinding of a roll of film in a camera, comprising:

film transporting means for advancing and rewinding the film;

film movement signal generating means for generating a film movement signal as the film moves;

start signal outputting means for outputting a rewinding start signal for starting a film rewinding operation;

first timer means for beginning to count time from the beginning of the film rewinding operation and for outputting a first signal when a first predetermined period of time elapses;

second timer means for outputting a second signal when said film movement signal is not output from said film movement signal outputting means for a second predetermined period of time, said second timer means being reset and restarted by the output of said film movement signal outputting means; and control means for causing said film transporting means to start a film rewinding operation in response to the rewinding start signal output from said start signal outputting means for causing said film transporting means to continue the film rewinding operation until said first signal is output from said first timer means, and for causing said film transporting means to stop said film rewinding operation in response to said second signal output from said second timer means after said first signal has been output from said first timer means.

9. The device according to claim 8, wherein said first period of time is longer than said second period of time.

10. The device according to claim 8 wherein said start signal outputting means outputs the rewinding start signal at the termination of exposure of all the frames of the film.

11. The device according to claim 8, wherein said start signal outputting means outputs the rewinding start signal in response to an operation of an operating member instructing premature rewinding of the film, which is operated before all the frames of the film are exposed.

12. A device for controlling a rewinding a roll of film in a camera, comprising:
 film transporting means for advancing and rewinding the film;
 film movement signal outputting means for outputting a film movement signal as the film is transported by said film transporting means;
 start signal outputting means for outputting a film rewinding operation start signal;
 first control means for causing said film transporting means to start a film rewinding operation in response to said film rewinding operation start signal from said start signal outputting means, and for keeping the film rewinding operation for a first predetermined period of time;
 no-signal outputting state detection means for detecting a state in which no film movement signals are continuously output, for a second predetermined period of time; and
 second control means for causing said film transporting means to stop the film rewinding operation in response to a signal output from said no-signal outputting state detection means after a lapse of the first predetermined period of time.

13. The device according to claim 12, wherein said first control means further includes:
 detecting means for detecting the number of frames the film has and the number of exposed frames of the film; and
 setting means responsive to the results of detection by said detecting means for setting said first predetermined period of time.

14. The device according to claim 12, wherein said first predetermined period of time is longer than said second predetermined period of time.

15. The device according to claim 12, wherein said start signal outputting means outputs the rewinding start signal at the termination of exposure of all the frames of the film.

16. The device according to claim 12, wherein said start signal outputting means outputs the rewinding start signal in response to an operation of an operating member instructing premature rewinding of the film, which is operated before all the frames of the film are exposed.

17. The device according to claim 12, further comprising:
 film type detecting means for detecting the type of the film; and
 setting means responsive to said film type detecting means for setting said first predetermined period of time.

18. The device according to claim 17, wherein said film type detecting means detects the number of frames that the film has.

19. A device for controlling a rewinding a roll of film in a camera, comprising:
 motor-driven film rewinding means for rewinding the film;
 start signal outputting means for outputting a film rewinding operation start signal;
 start means for causing said motor-driven film rewinding means to start a film rewinding operation in response to a start signal output from said start signal outputting means;
 film movement signal outputting means for outputting a film movement signal as the film moves;
 reference time generation means for generating a first reference period of time and a second reference period of time;
 film stoppage detection signal outputting means for outputting a film stoppage detection signal when no film movement signals are continuously output from said film movement signal outputting means for the second reference period of time; and
 control means for causing said motor-driven film rewinding means to stop the film rewinding operation in response to the film stoppage detection signal from said film stoppage detection signal outputting means, and
 wherein said film stoppage detection signal outputting means starts operation after a lapse of the first reference period of time from the beginning of the film rewinding operation.

20. A motor-driven film rewinding device, comprising:
 motor-driven film rewinding means operated in response to one of a film end signal and a manual film rewinding start signal;
 first count means for counting a first reference period of time when said motor-driven film rewinding means is operated;
 second count means for counting a second reference period of time after a lapse of the first reference period of time; and
 control means for causing a film rewinding operation to be continued during the first reference period of time, for causing said second count means to be reset and restarted when film movement is detected during the second reference period of time, and for causing said motor-driven film rewinding means to stop after a lapse of the second reference period of time when the film movement is not detected until the second reference period of time elapses.

* * * * *

UNITED STATES PATENT AND TRADEMARK OFFICE
CERTIFICATE OF CORRECTION

PATENT NO. : 5,300,975

DATED : April 5, 1994

INVENTOR(S) : Keiji KUNISHIGE

It is certified that error appears in the above-identified patent and that said Letters Patent is hereby corrected as shown below:

Title page, Item [56] References Cited, under U.S. PATENT DOCUMENTS, change "4,437,163" to --4,477,163--.

Signed and Sealed this

Tenth Day of January, 1995

*Attest:*

BRUCE LEHMAN

*Attesting Officer*   *Commissioner of Patents and Trademarks*